US005625483A

United States Patent [19]
Swartz

[11] Patent Number: 5,625,483
[45] Date of Patent: Apr. 29, 1997

[54] INTEGRATED LIGHT SOURCE AND SCANNING ELEMENT IMPLEMENTED ON A SEMICONDUCTOR OR ELECTRO-OPTICAL SUBSTRATE

[75] Inventor: Jerome Swartz, Old Field, N.Y.

[73] Assignee: Symbol Technologies, Inc., Holtsville, N.Y.

[21] Appl. No.: 111,532

[22] Filed: Aug. 25, 1993

Related U.S. Application Data

[63] Continuation-in-part of Ser. No. 745,776, Aug. 16, 1991, abandoned, which is a continuation of Ser. No. 530,879, May 29, 1990, abandoned.

[51] Int. Cl.$^6$ .................................................. G02B 26/08
[52] U.S. Cl. ........................... 359/224; 359/196; 359/223; 235/470
[58] Field of Search ................................ 359/213, 214, 359/196, 197, 223, 224; 250/234, 235, 236; 235/462, 470, 454, 467, 472; 347/138, 242, 245, 257, 263; 358/505, 510, 513, 424, 480

[56] References Cited

U.S. PATENT DOCUMENTS

| 4,229,732 | 10/1980 | Hartstein et al. | 340/815.4 |
|---|---|---|---|
| 4,356,730 | 11/1982 | Cade | 73/517 R |
| 4,441,791 | 4/1984 | Hornbeck | 359/295 |
| 4,462,658 | 7/1984 | Scifres et al. | 385/8 |
| 4,539,473 | 9/1985 | Brogardh et al. | 250/214.1 |
| 4,733,067 | 3/1988 | Oinoue et al. | 250/216 |
| 4,758,717 | 7/1988 | Shepard et al. | 235/472 |
| 4,764,244 | 8/1988 | Chitty et al. | 156/630 |
| 4,805,038 | 2/1989 | Seligson | 358/296 |
| 4,856,858 | 8/1989 | Koike et al. | 359/213 |
| 4,864,824 | 9/1989 | Gabriel et al. | 60/527 |
| 4,930,848 | 6/1990 | Knowles | 359/214 |
| 4,956,619 | 9/1990 | Hornbeck | 359/317 |
| 4,966,037 | 10/1990 | Sumner et al. | 73/204.26 |
| 5,061,914 | 10/1991 | Busch et al. | 337/140 |
| 5,100,220 | 3/1992 | Voegeli | 385/14 |
| 5,150,250 | 9/1992 | Setani | 359/221 |
| 5,159,225 | 10/1992 | Um | 310/328 |
| 5,175,465 | 12/1992 | Um et al. | 310/328 |
| 5,188,983 | 2/1993 | Guckel et al. | 437/209 |
| 5,202,785 | 4/1993 | Nelson | 359/214 |
| 5,206,557 | 4/1993 | Bobbio | 310/309 |
| 5,216,273 | 6/1993 | Doering et al. | 257/419 |
| 5,216,490 | 6/1993 | Greiff et al. | 73/517 R |

FOREIGN PATENT DOCUMENTS

| 61-129893 | 6/1986 | Japan . |
|---|---|---|
| 63-199480 | 8/1988 | Japan . |
| 2175705 | 12/1986 | United Kingdom . |

OTHER PUBLICATIONS

Huthenson et al. "Optical Interconnects Replace Hardwire" IEEE Spectrum (Mar. 1987) pp. 30–35.

"IBM–TI Announce Better Ways to Manipulate Light Signals", The IEEE Institute, vol. 13, No. 11 (1989) p.6.

Robinson et al., "Monolithically Integrated Array of GaAlAs Electroabsorption Modulators," Electronics Letters, vol. 20, No. 17, (Aug. 16, 1984), pp. 678–680.

(List continued on next page.)

Primary Examiner—Paul M. Dzierzynski
Assistant Examiner—Darren E. Schuberg
Attorney, Agent, or Firm—Finnegan, Henderson, Farabow, Garrett & Dunner

[57] ABSTRACT

An integrated laser scanning device including: a substrate of semiconductor and/or electro-optical material, a laser light source disposed on the substrate; and a scanner disposed on the substrate in the path of the laser beam for repetitively and cyclically moving the laser beam so as to form a scanning beam for repetitively scanning a target for reflection therefrom. In particular, the scanner comprises a layer of reflective material disposed on a moveable structure on the substrate, the plane of such layer being disposed at an acute angle with respect to the laser beam so that the beam is directed along an optical path toward indicia located in the vicinity of a reference plane lying in the optical path so as to scan spatially adjacent portions of the reference plane along a relatively elongated scanning line.

24 Claims, 4 Drawing Sheets

OTHER PUBLICATIONS

Peterson, Kurt E., "Silicon Torsional Scanning Mirror," IBM J. Res. Dev. vol. 24, No. 5, (Sep. 1980), pp. 631–635.

Fayfield et al., "Piezoelectric Thin Film Stress Sensors for Metal–Forming Operations," Proc. of 1989 IEEE Ultrasonics Symposium.

Robbins, W.P. "Insert–Mounted Thin Film Sensors for Real–Time Monitoring of Tool Conditions," Thin Solid Films, 166, (1988) pp. 387–396.

Klamecki et al., "Interface Load Sensing for Process Analysis and Control," Proceedings of NSF Design and Manufacturing Systems Conference, (1990).

Judy et al., "A Linear Piezoelectric Stepper Motor With Submicrometer Step Size and Centimeter Travel Range," IEEE Trans. on Ultrasonics, Ferro–electrics and Frequency Control, vol. 37, No. 5, (Sep. 1990), pp. 428–437.

Katz, J., "Phase Control and Beam Steering of Semiconductor Laser Arrays," TDA Progress Report, (Jan. and Feb. 1982), pp. 42–68.

"IBM, TI Announce Better Ways to Manipulate Light Signals," The Institute (IEEE), vol. 13, No. 11, (1989), p. 6.

Hutcheson et al., "Optical Interconnects Replace Hardwire," IEEE Spectrum, (Mar. 1987), pp. 30–35.

INTEGRATED LIGHT SOURCE AND SCANNING ELEMENT IMPLEMENTED ON A SEMICONDUCTOR OR ELECTRO-OPTICAL SUBSTRATE

REFERENCE TO RELATED CASES

This application is a continuation-in-part of U.S. patent application Ser. No. 07/745,776, filed Aug. 16, 1991, now abandoned, which was a continuation of Ser. No. 07/530,879, filed May 29, 1990, now abandoned. This application is also related to U.S. patent application Ser. No. 493,134, filed Mar. 13, 1990, said application being assigned to Symbol Technologies, Inc.

BACKGROUND OF THE INVENTION

1. Field of the Invention

This present invention generally relates to laser scanning systems for reading data in the form of indicia such as bar code symbols and, more particularly, to a compact, integrated light source and scanning element implemented on a single semiconductor and/or electro-optical substrate.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. A number of different bar code standards or symbologies exist. These symbologies include UPC/EAN, Code 128, Codabar, and Interleaved 2 of 5. The readers and scanning systems electro-optically decode the symbol to multiple alphanumerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to the same assignee as the instant application.

As disclosed in some of the above patents, one embodiment of such a scanning system resides, in a device that emits a laser light beam from a hand-held, portable laser scanning head supported by a user, and aiming the head, and more particularly, the laser light beam, at a symbol to be read. The scanner functions by repetitively scanning the laser beam in a line across the symbol. A portion of the reflected laser light which is reflected off the symbol is detected, and electronic circuitry or software decodes the electrical signal into a digital representation of the data represented by the symbol scanned.

More specifically, a scanner includes a light source such as a gas laser or semiconductor laser that generates a light beam. The use of a semiconductor devices as the light source in scanner systems is especially desirable because of their small size, low cost and low power requirements. The light beam is optically modified, typically by a lens, to form a beam spot of a certain size. It is preferred that the beam spot size be approximately the same as the minimum width between regions of different light reflectivity, i.e., the bars and spaces of the symbol. The relative size of the bars and spaces is determined by the type of coding used, as is the actual size of the bars and spaces. The number of characters per inch represented by the bar code symbol is referred to as the density of the symbol.

The light beam is directed by the lens or similar optical components along a light path toward a target that includes a bar code symbol on the surface. A scanning component is also disposed in the light path. The scanning component may either sweep the beam spot across the symbol and trace a scan line across and past the symbol, or scan the field of view of the scanner or do both. A scanner also includes a sensor or photodetector. The photo-detector has a field of view which extends across and slightly past the symbol and functions to detect light reflected from the symbol. The analog electrical signal from the photodetector is first typically converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The scanning component typically includes a moving mirror, such as a rotating polygon or a planar mirror which is repetitively and reciprocally driven in alternate circumferential directions about a drive shaft on which the mirror is mounted. However, the use of mechanical driven mirrors adds to the weight and size of the scanner, and also presents various reliability issues. Such drawbacks have led to consideration of techniques for generating and moving a scanning beam in a single integrated component.

Various approaches for generating a scanning beam by implementing arrays of lasers on a substrate are known in the prior art.

U.S. Pat. No. 4,445,125 describes a linear array of injection diode lasers formed on a common substrate to provide modulated scanning beams for a photosensitive medium. A scanning device, preferably a multifaceted mirror polygon driven at a constant speed, is placed in the optical path between the array and the photosensitive medium, as is a focusing lens. To provide additive exposure intensity the plane of the emitting surface of the array is oriented relative to the scanning device so that all of the beams emitted by the array are caused to illuminate the same scan line of the photosensitive medium whereby each beam scans the same data spots on the same line of the photosensitive medium.

U.S. Pat. No. 4,462,658 describes an optical scanner with a thin waveguide medium on a substrate includes means to couple a wide collimated beam of radiation into one end of the medium. A periodic array of substantially parallel, spaced electrodes are associated with one major surface of the medium. At least a portion of the electrode lengths extend in a direction substantially parallel with the direction of radiation propagating through the medium. Supply means are provided to apply voltage in a pattern to the electrodes which varies from one electrode to the next adjacent electrode to a predetermined value over several of the electrodes and the same pattern of voltages or a similar pattern of different voltages is applied over several of the next adjacent electrodes up to the predetermined value. In this manner, the pattern is completed across the electrode array to produce an electro-optical effect in which a corresponding approximation of a desired phase retardation along a phase front of the propagating radiation in the medium. Further means are employed to change the magnitude of the applied voltages across the electrode array to vary the approximation of the phase retardation to cause the radiation beam to scan in a direction of radiation propagation in the medium.

Still another approach for deflecting a beam on a substrate also based on the electro-optical effect uses devices to direct a laser beam in one or more waveguides on a substrate. Optical waveguides are typically fabricated from a pyroelectric material such as lithium niobate or lithium tantalate or from semiconductor materials such as gallium arsenide or indium phosphide. Wavepaths or waveguides are generally fabricated in the substance by depositing a dopant such as titanium on the surface of the substrate in the pattern desired for the wavepaths. The substrate is then heated to diffuse the dopant into the substrate. This procedure forms wavepaths or waveguides, i.e., a section in the pyroelectric material that guides light, usually about 3 to 10 mu m wide. To permit logic operations, signal processing, or switching between wavepaths in the pyroelectric material, an electric field is imposed across the region of the crystal where a change in beam direction is desired. Such a field is generated by electrodes deposited on the substrate for this purpose. The field produces local changes in the optical polarizability of the crystal, thus locally changing the refractive index and, in turn, altering the path of light through the crystal.

Reference should also be made to publications describing a proposed integrated light source and scan element implemented on a single substrate and demultiplexes via intensity modulator array which can be used for scanning. Namely, J. Katz, "Phase Control and Beam Steering of Semiconductor Laser Arrays", TDA Progress Report 42-68, January February 1982, and D. L. Robinson et al, Monolithically Integrated Array of GaAlAs Electroabsorption Modulators, Electronic Letters, 16th August 1984, Vol. 20 No. 17 pp. 678–680.

Prior to the present invention there has not been an integrated light source and scanning element implemented on a single substrate.

SUMMARY OF INVENTION

Briefly, and in general terms, the present invention provides an integrated laser scanning device including a substrate; means for generating a laser beam disposed on said substrate; and scanning means disposed on said substrate in the path of said laser beam for repetitively and cyclically moving said laser beam so as to form a scanning beam for repetitively scanning a target for reflection therefrom. More particularly, the scanning means comprises a layer of reflective material disposed on said substrate, the plane of said layer being disposed at an acute angle with respect to said laser beam so that said beam is directed along an optical path toward indicia located in the vicinity of a reference plane lying in the optical path so as to scan spatially adjacent portions of the reference plan along a relatively elongated scanning line.

The novel features which are considered as characteristics for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENT

The present invention generally relates to laser scanning systems for reading data in the form of indicia such as bar code symbols and, more particularly, to a compact, integrated light source and scanning element implemented on a single semiconductor or electro-optical substrate.

As used in this specification and the following claims, the term "symbol" and "bar code" is intended to be broadly construed and to cover not only patterns composed of alternating bars and spaces of various widths, but also other one or two dimensional graphic patterns, as well as alphanumeric characters.

Figure 1A:
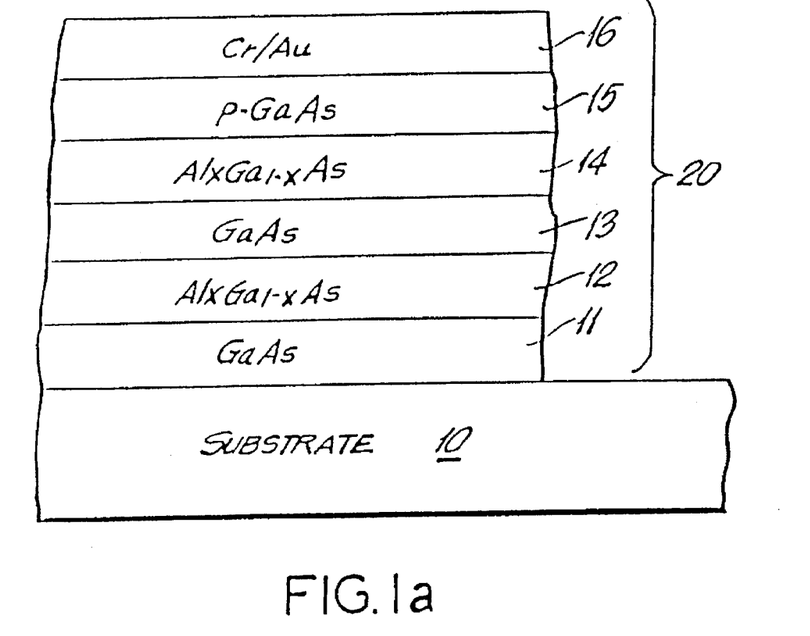
FIGS. 1a and 1b are highly simplified enlarged cross-sectional views of a portion of two different semiconductor structures for implementing a semiconductor laser portion of the device according to the present invention.
Figure 1B:
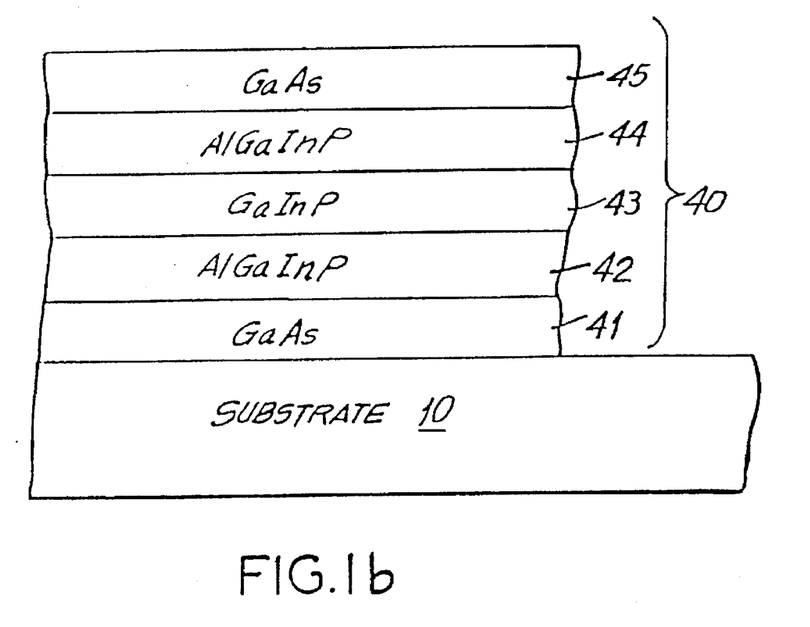

Referring first to FIG. 1, there is shown in FIGS. 1a and 1b two different embodiments of a semiconductor structure for implementing a semiconductor laser in accordance with the present invention.

The starting point of fabricating the semiconductor structure according to the present invention is to provide a semi-insulating crystal substrate 10, preferably composed of gallium arsenide (GaAs) oriented in the 100 direction. An electrical contact (not shown) may be applied to the substrate to provide one of the electrical contacts to the device.

The following description focuses on the growth and deposition of the semiconductor structure as is known in the art. The layers are grown sequentially on the substrate 10 according to molecular beam epitaxy techniques known in the art, although any other suitable deposition technique could be used as well, such as vapor phase epitaxy, e.g., metal organic chemical vapor deposition. The first embodiment will be described with reference to FIG. 1a, and the second embodiment with reference to FIG. 1b.

Turning to FIG. 1a, there is shown a multiple layer structure 20 on the substrate 10 that provides an active region or layer bounded by upper and lower clad layers. For laser or highly efficient light emitting operation, it is necessary that the electromagnetic radiation produced in the active region remains mainly in the active region. Thus, the active layer is situated between two clad layers having a lower refractive index than the active region.

A first layer 11 of undoped gallium arsenide is deposited on the substrate 10 to serve as a buffer layer. The thickness of the first layer 11 is preferably in excess of 1 micron. In some cases it may be desirable to have an interface between the substrate 10 and the first layer 11.

A second layer 12 of undoped $Al_xGa_{1-x}As$ semiconductor material having a thickness of greater than one micron is then deposited on the first layer 11 to form a first cladding layer. The cladding layer 12 is selected so as to have a larger bandgap energy and smaller optical refraction index than the active layer.

A semiconductor laser active region 13 is then deposited on the second layer 12 to form the active region of the device. In the preferred embodiment of a double heterostructure (DH) laser, the laser active region 13 may itself be composed of a single layer of GaAs, or in other embodiments the active region 13 may be a sequence of three layers ($Al_xGa_{1-x}As$, GaAs, and $Al_xGa_{1-x}As$) or more, in a quantum well embodiment.

As an example in case the active region 13 is composed of three layers, the growth of the first $Al_xGa_{1-x}As$ layer begins with an aluminum fraction x between 10% and 50% adjacent to the clad layer 12 and grades down to a composition of 0% aluminum at the surface of the GaAs layer. The purpose of this layer is to provide optical wave-guiding in the semiconductor laser. As is well known to those skilled in the semiconductor laser art, the exact composition profile of the wave-guiding layer is not critical provided that the overall thickness of the wave-guiding structure is such as to support a single optical mode between the two wave-guiding layers. The third layer of $Al_xGa_{1-x}As$ begins at a composition of 0% aluminum at the surface of the GaAs layer, and increases to 50% at the top surface.

Carrier recombination occurs in active region 13 relative to the heterostructure p-n junction established between layers 12 and 14. Upon application of pumping current I via the electrodes associated with the device, a radiation propagating cavity is established in active region 13 with resonator feedback provided by the mirror facets (not shown). The radiation is produced in the active region 13 by carrier recombination, and the radiation propagates in a cavity parallel to the elongated extent of the upper electrode.

The mirror facets may be provided with additionally deposited mirrors, such as dielectric stack mirrors, or etched mirrors as are known in the art.

Another layer 14 of $Al_xGa_{1-x}As$ semiconductor material in deposited on the region 13 to form the second cladding layer. The second cladding layer has a larger bandgap energy and smaller optical refraction index than the active region 13.

The contact layer 15 is epitaxially grown on top of layer 14 and may preferably be p-type GaAs to facilitate making ohmic contact to the electrode 16. The electrode 16 is formed by depositing a layer of metal, typically chrome-gold, on top of layer 15.

Turning to FIG. 1b, there is shown another embodiment of a multiple layer structure 40 on the substrate 10 that provides an active layer bounded by upper and lower clad layers. For laser or highly efficient light emitting operation, it is necessary that the electromagnetic radiation produced in the active region remains mainly in the active region. Thus, the active layer is situated between two clad layers having a lower refractive index than the active region.

A first layer 41 of undoped gallium arsenide is deposited on the substrate 10 to serve as a buffer layer. The thickness of the first layer 41 is preferably in excess of one micron.

A second layer 42 of undoped $Al_xGaInP$ semiconductor material having a thickness of greater than one micron is then deposited on the first layer 41 to form a first cladding layer. The cladding layer 42 is selected so as to have a larger bandgap energy and smaller optical refraction index than the active layer.

A semiconductor laser active region 43 is then deposited on the second layer 42 to form the active region of the device. In the preferred embodiment of a double heterostructure (DH) laser, the laser region 43 may itself be composed of a sequence of three layers.

Carrier recombination occurs in active region 43 relative to the heterostructure p-n junction established between layers 42 and 44. Upon application of pumping current I by means of the electrodes, a radiation propagating cavity is established in active layer 43 with resonator feedback provided by the mirror facets (not shown). The radiation produced in the active region 43 by carrier recombination propagating in a cavity parallel to the elongated extent of electrode.

The mirror facets may be provided with additionally deposited mirrors, such as dielectric stack mirrors, or etched mirrors as are known in the art.

The contact layer 45 is epitaxially grown on top of layer 44 and may preferably be p-type GaAs to facilitate making ohmic contact to the upper electrode (not shown). The electrode may be formed by depositing a layer of metal, typically chrome-gold, on top of layer 45.

Figure 2:
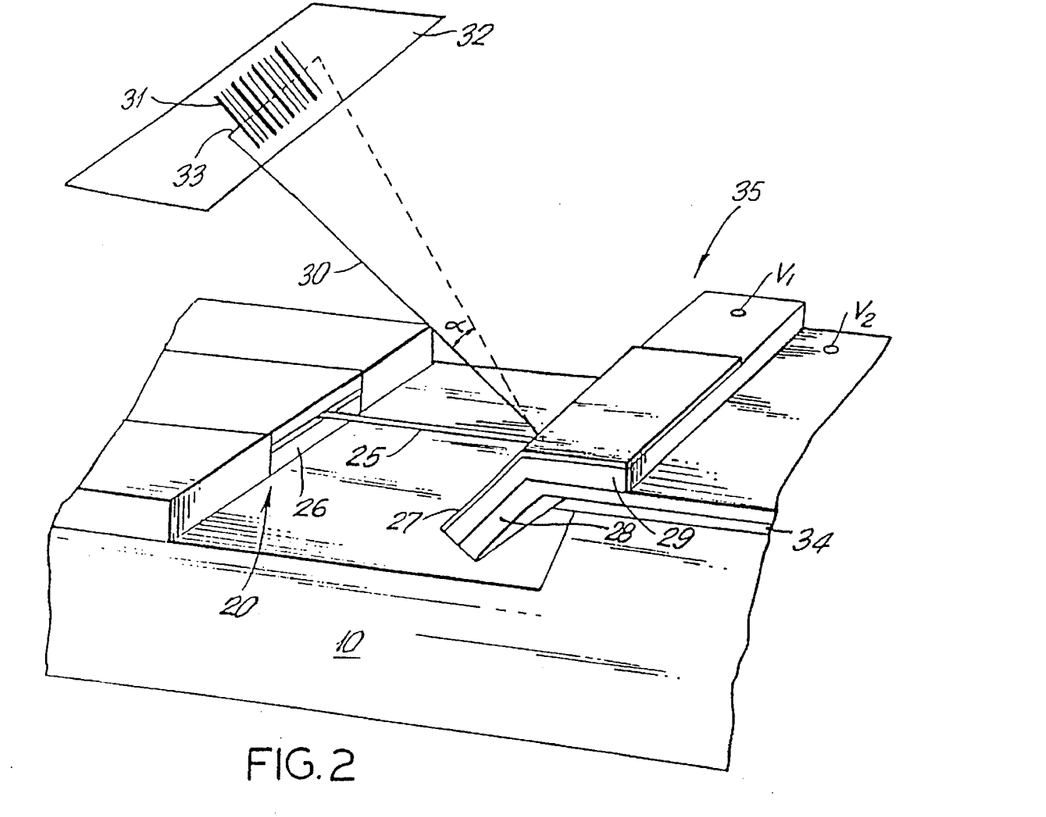
FIG. 2 is a highly simplified diagrammatic perspective view of the semiconductor structure according to a first embodiment of the present invention.

Referring to FIG. 2, there is shown a highly simplified perspective view of a semiconductor structure according to a first embodiment of the present invention in which the basic elements of a bar code reader may be implemented.

The substrate 10 includes a first portion including a multiple layer structure 20, i.e., a semiconductor laser diode, which when energized, generates a laser beam 25 which is emitted from an edge 26 of the light structure 20. Although the use of reference numeral 20 in FIG. 2 suggests the use of the structure 20 of FIG. 1a, the use of structure 40 of FIG. 1b or yet other structures may be used as well.

The structure 20 generates a laser beam which is propagated through free space to a reflective structure 27. The beam may be collimated or focussed by a lens or other optical element (not shown) to form a beam of a suitable size, shape, and orientation prior to it reaching the reflective structure 27. The beam 25 is more particularly directed to a reflective surface 27 which is moved or reciprocated by means to be explained subsequently. The movement of the surface 27 causes the laser beam 25 to be deflected, so as to produce a scan line or other pattern across a symbol 31 disposed on the surface 32 of a target in the path of the reflected beam.

In the preferred embodiment, the reflective surface 27 is a layer applied to the top of a piezoelectric composite, 28, 29 disposed on the substrate 10. The composite consists of two layers of a piezoelectric material responsive to an enabling electrical signal. A soft, pliable layer 34 of interface material, such as a glass composition, is applied to the surface of the substrate 10. The layer 28 which is the first layer of piezoelectric is applied to the layer 34 and the second layer of piezoelectric material 29 is applied on top of the layer 28. The layer 34 permits the layers 28 and 29 to move with respect to one another without transmitting such stresses to the substrate 10. An electrode V1 is connected to the layer of piezoelectric 29, and electrode V2 is connected to the layer of piezoelectric material 28. The layers of piezo-electric material preferably comprise lead zirconate and lead titanate, also known as PZT.

When an electric current is applied to the electrodes V1 and V2 the relative position of the layers 28 and 29 move as is known in the art, which results in a deflection of the reflective surface 27. The electric signals applied to the electrodes V1 and V2 therefore function to repetitively and cyclically change the position of the reflective element in the path of the laser beam 25 so as to transform the laser beam 25 into a scanning beam 30 for repetitively scanning the target 32 for reflection therefrom.

Although the prefer red embodiment is illustrated with the use of a piezoelectric composite 28, 29, it is to be understood that the use of any type of movable bendable or deformable structure is within the scope of the present invention. Thus, instead of a composite 28, 29 a single member may be used which bends or moves under electrical (or electromagnetic field) activation. The second embodiment of the invention, to be described below, the member is a mirror which moves by pivoting under the influence of an electromagnetic field. Other examples (not shown), may be bending by thermal deformation initiated by electrical activation and heating.

The plane of the layer of the reflective surface is disposed at an acute angle with respect to the laser beam 25 so that the beam is directed along an optical path toward indicia 31 located in the vicinity of a reference plane 32 lying in the optical path so as to scan spatially adjacent portions of the reference plane 32 along a relatively elongated scanning line 33.

Figure 3:
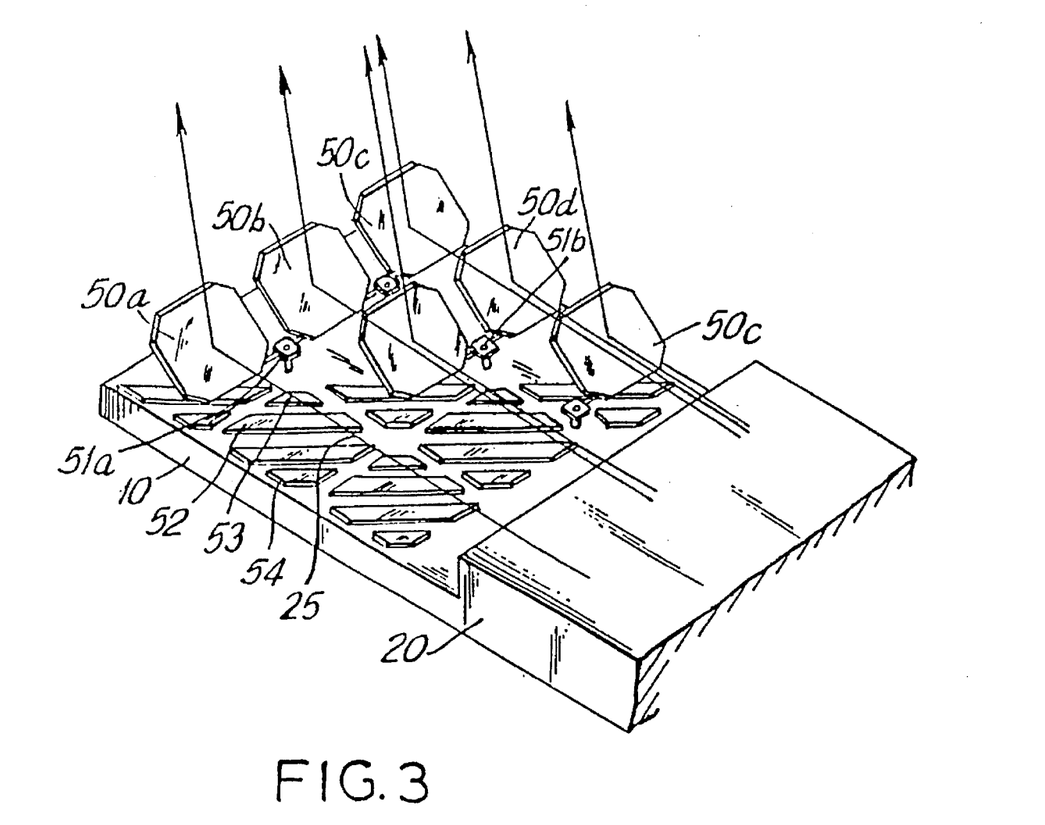
FIG. 3 is a highly simplified diagrammatic perspective view of the semiconductor structure according to a second embodiment of the present invention.

Referring next to FIG. 3 there is shown a highly simplified perspective view of a semiconductor structure according to a second embodiment of the present invention. As in FIG. 2, the structure consists of a substrate 10 including a first portion consisting of a multiple layer structure 20, i.e., a semiconductor laser diode, which when energized, generates a laser beam 25.

The beam 25 is directed to a plurality of reflective surfaces 50a, 50b, 50c, 50d, 50e, etc., which are implemented on the surface of the substrate 10. More particularly the reflective elements 50a, 50b, etc., are micromirrors which are attached to support posts 51a, 51b, etc., on the surface of the substrate 10. The mirror surfaces 50a, 50b, etc., lie over and spaced apart from a pattern of control electrodes 52, 53, 54, etc., which are repetitively and cyclically energized so as to cause the mirror surfaces 50a, 50b, etc., to rotate on the support posts 51a, 51b, etc. The rotation of the mirror surfaces through a relatively small angle results in the laser beam striking the surface of the mirror surfaces being deflected as is shown in the reflected beams 25a and 25b. The movement of the laser beam 25 produces a scan line of other pattern across a symbol 31 disposed on a target in the path of the reflected beam.

The arrangement according to the present invention may be packaged in an integrated circuit package with a window for the emitted laser beam and implemented on a printed circuit (PC) board with other electronic components. Such a PC board may be packaged in a hand-held scanner, a desktop workstation or stationary scanner. In a preferred embodiment, the arrangement would be implemented in a housing that includes an exit port through which an outgoing laser light beam 30 is directed to impinge on, and to be scanned across, symbols 31 located on a target 32 situated exterior of the housing.

Before describing the third embodiment of the present invention, it is worthwhile to illustrate the packaging or implementation of the arrangement according to the present invention.

Figure 4:
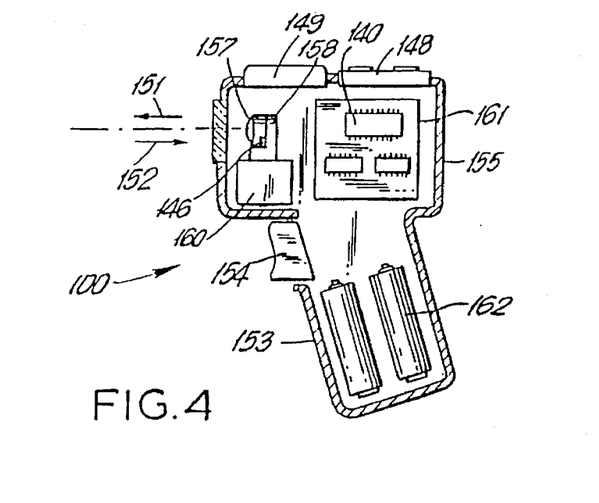
FIG. 4 is a highly simplified diagrammatic cross-sectional view of a hand-held scanner incorporating the semiconductor structure according to the present invention.

As an example of such an embodiment, we described the implementation of the present invention in a hand-held, laser-scanning, bar code reader unit such as illustrated in FIG. 4. This hand-held device of FIG. 4 is generally of the style disclosed in U.S. Pat. No. 4,760,248, issued to Swartz et al, assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 4. These U.S. Pat. No. 4,760,248, 4,387,297 and 4,409,470 are incorporated herein by reference.

The operation of such a unit may be described as follows: An outgoing light beam 151 is generated in the reader 100, usually by a laser diode or the like, and directed to impinge upon a bar code symbol spaced at a distance from the front of the reader unit. The outgoing beam 151 is scanned in a fixed linear pattern, and the user positions the hand-held unit so this scan pattern traverses the symbol to be read. Reflected light 152 from the symbol is detected by a light-responsive device 146 in the reader unit, producing serial electrical signals to be processed for identifying the bar code. The reader unit 100 is a gun shaped device, having a pistol-grip type of handle 153 and movable trigger 154 is employed to allow the user to activate the light beam 151 and detector circuitry when pointed at the symbol to be read, thereby saving battery life if the unit is self-powered. A light-weight plastic housing 155 contains the laser light source, the detector 146, the optics and signal processing circuitry, and the CPU 140 as well as a battery 162. A light-transmissive window 156 in the front end of the housing 155 allows the outgoing light beam 151 to exit and the incoming reflected light 152 to enter. The reader 100 is designed to be aimed at a bar code symbol by the user from a position where the reader 100 is spaced from the symbol, i.e., not touching the symbol or moving across the symbol. Typically, this type of hand-held bar code reader is specified to operate in the range of perhaps several inches.

As seen in FIG. 4, a suitable lens 157 (or multiple lens system) is used to collimate and focus the scanned beam into the bar code symbol at an appropriate reference plane, and this same lens 157 may be used to focus the reflected light 152. A scanning light source 158 such as a semiconductor device according to the present invention is positioned to introduce a light beam into the axis of the lens 157 by appropriate beam-shaping structure needed, when the trigger 154 is pulled. If the light produced by the source 158 is not visible, an aiming light may be included in the optical system to introduce the beam into the light path coaxially with the lens 157. The aiming light, if needed, produces a visible-light spot which is scanned just like the laser beam; the user may employ this visible light to aim the reader unit at the symbol before pulling the trigger 154 to activate the scanning.

Figure 5:
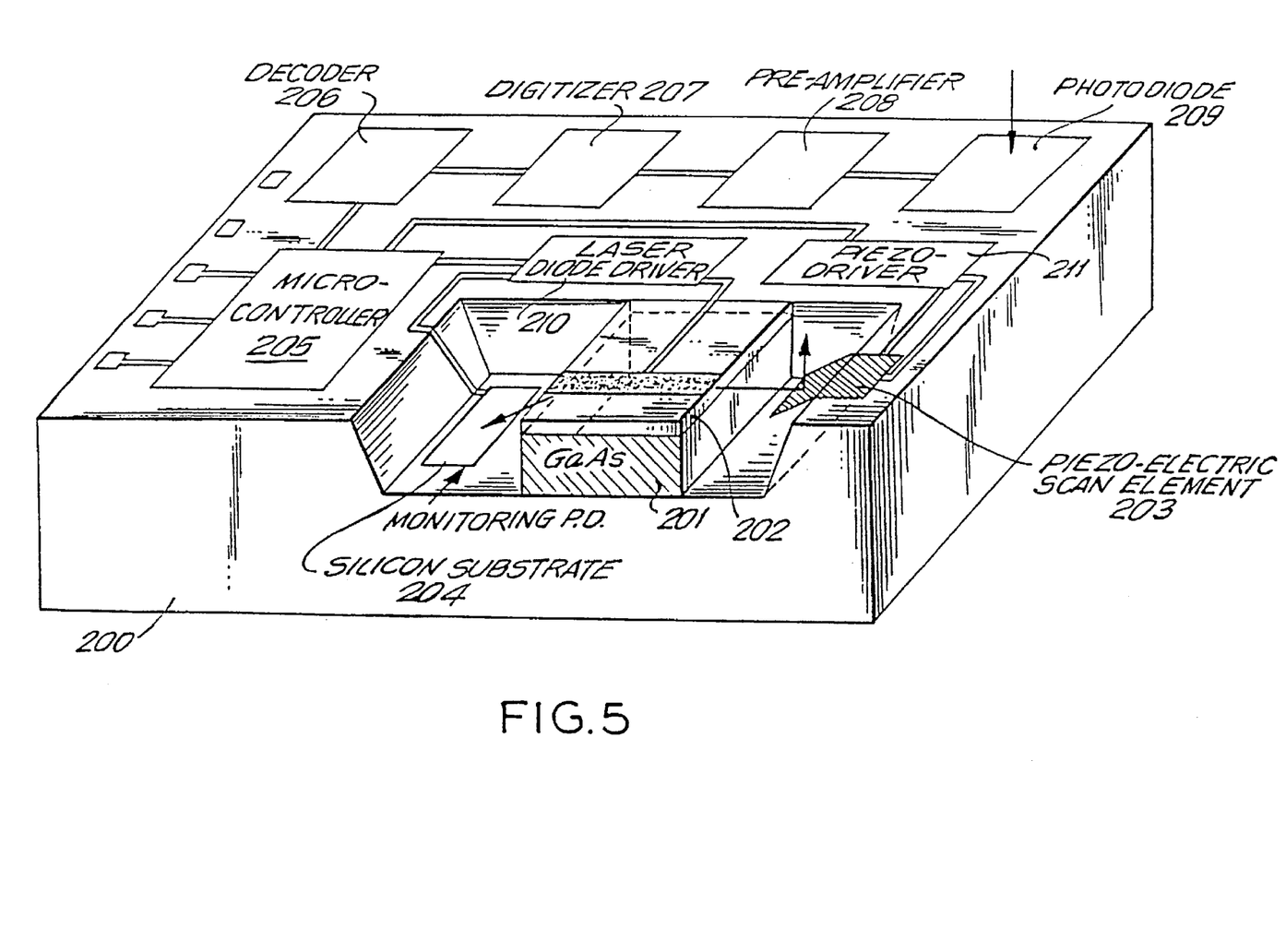
FIG. 5 is a highly simplified block diagram perspective view of a semiconductor device according to a third embodiment of the present invention.

Turning to FIG. 5, there is shown another embodiment of the present invention in which an entire scanner is implemented on a silicon substrate. A silicon substrate 200 is provided which includes a layer 201 composed of GaAs on a portion of the surface thereof. On top of the layer 201 is a sequence of layers 202 which form a semiconductor laser such as shown in FIGS. 1a and 1b. The output laser beam from the semiconductor laser is directed to a piezoelectric scan element 203 which is also implemented on the surface of the silicon substrate 200 in accordance with the present invention. The scan element 203 may be similar to that of the composite 28, 29 described in FIG. 2.

A number of additional elements of the scanner may also be implemented on the same silicon substrate 200 as is shown in the Figure. For example, a monitoring photodiode 204 may be implemented on the silicon substrate to measure the output of the semiconductor laser 202. An integrated circuit microcontroller 205 may also be implemented on the same surface of the silicon substrate 200, along with a decoder 206, digitizer 207, preamplifier 208, photodiode 209, laser diode driver 210, and piezoelectric scan element driver 211. In addition to the elements of a bar code reader, other computer system elements may be implemented on the substrate 200 including those elements associated with a portable terminal, such as memory, display driver, keyboard interface, and communications interfaces. More advanced communications functions may also be implemented such as a radio or other signal generator. All such units may be connected by means of bus electrodes 212 implemented on the surface of the chip. Contact pads 213 as is known in the art may be implemented on the periphery of the substrate 200 for connection to external wires and for packaging the integrated circuit into a package.

Although the present invention has been described with respect scanners for reading linear or single line bar codes, it is not limited to such embodiments, but may also be applicable to more complex scanning patterns and to stacked or two dimensional bar codes such as Code 49 and similar symbologies. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact IC package or module. Such a package or module can interchangeably be used as the laser scanning element for a variety of different types of data acquisition systems. For example, the module may be alternately plugged in and used in a hand-held scanner, a table top scanner attached to a flexible arm or mounting extending over the surface of the table or attached to the underside of the table top, or mounted as a subcomponent or subassembly of a more sophisticated data acquisition system.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in a scanning system implemented on a semiconductor and/or electro-optical substrate, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

I claim:

1. An integrated scanning device comprising:
    a substrate composed of a crystalline semiconductor material;
    a semiconductor device for generating a light beam disposed on a first portion of said substrate; and
    scanning means including a scanning element disposed on a second portion of said substrate in the path of said light beam, said scanning element including first and second layers of piezoelectric material and being capable of mechanical motion so that said beam is directed by said scanning element so as to form a scanning beam for repetitively scanning a target for reflection therefrom.

2. A device as defined in claim 1, wherein said scanning element includes a surface layer of reflective material, the plane of said layer being disposed at an acute angle with respect to said light beam so that said beam is deflected by said scanning element and directed along an optical path toward indicia located in the vicinity of a reference plane lying generally normal to the optical path so as to scan spatially adjacent portions of the reference plane along a scanning line.

3. A device as defined in claim 1, wherein said piezoelectric material comprises lead zirconate and lead titanate.

4. A device as defined in claim 1, wherein said semiconductor device comprises a semiconductor laser.

5. A device as defined in claim 1, wherein said element is mounted on said substrate by a support post and wherein said scanning means further comprises electrodes operatively associated with said element so that said element is responsive to an enabling electrical signal on said electrodes for changing its position by pivoting as to change the direction of the light beam reflected therefrom.

6. A device as defined in claim 5, wherein said electrical signal is operative to cause said element to pivot.

7. A device as defined in claim 1, wherein said element is a flat square shaped metallic sheet pivoted at two opposed corners.

8. A device as defined in claim 1, wherein said mechanical motion is repetitive and cyclical.

9. A device as defined in claim 1, wherein said scanning element is a miniature mirror.

10. An integrated laser scanning device comprising:
    a substrate composed of a semiconductor or electro-optical material;
    a semiconductor laser disposed on said substrate for generating a laser beam; and
    scanning means including a miniature reflective scanning mirror composed of a composite capable of deformation when electrically activated and having a reflective surface disposed on said substrate in the path of said laser beam capable of repetitive motion so that said laser beam is deflected therefrom so as to form a scanning beam for repetitively scanning a target,
    wherein said semiconductor laser is formed by a plurality of regions of semiconductor material disposed in said substrate.

11. The integrated laser scanning device of claim 10, wherein the plurality of regions comprises a plurality of layers disposed on a planar surface of the substrate.

12. An integrated laser scanning device comprising:
    a semiconductor substrate;
    a semiconductor laser disposed on a first portion of said substrate for emitting a beam of light;
    beam deflective means composed of a deformable or bendable composite material disposed on a second portion of said substrate adjacent to said first portion and functioning by electrical activation to mechanically deflect said beam of light into a scanning beam for repetitively scanning a target for reflection therefrom.

13. An integrated laser scanning device comprising:
    a substrate composed of a semiconductor or electro-optical material;
    a semiconductor device disposed on said substrate for generating a light beam;
    scanning means composed of a deformable or bendable material composite, movable in response to electrical activation and disposed on said substrate in the path of said light beam for deflecting the light beam so as to form a scanning beam for repetitively scanning a target for reflection therefrom; and sensor means disposed on said substrate for detecting the variable intensity of light reflected from said target and for generating an analog electrical signal indicative of the detected intensity.

14. A device as defined in claim 13, wherein said scanning means comprises a reflective mirror element capable of moving in response to an electric signal.

15. A device as defined in claim 13, wherein said sensor means includes a photodetector implemented in said substrate.

16. A method of fabricating an integrated laser scanning device comprising the steps of:

providing a substrate composed of a crystalline semiconductor of electro-optical material;

forming a semiconductor device on a first portion of said substrate for generating a light beam; and forming a scanning element composed of a deformable or bendable composite on a second portion of said substrate in the path of said light beam, said element being capable of mechanical motion upon electrical activation so that said beam is directed by said scanning element so as to form a scanning beam for repetitively scanning a target for reflection therefrom.

17. A method as defined in claim 16, wherein said step of forming a scanning element includes forming a surface layer of reflective material, the plane of said layer being disposed at an acute angle with respect to said light beam so that said beam is deflected by said scanning element and directed along an optical path toward indicia located in the vicinity of a reference plane lying generally normal to the optical path so as to scan spatially adjacent portions of the reference plane along a scanning line.

18. A method of fabricating an integrated scanning device comprising the steps of:

providing a substrate;

forming a device on said substrate for generating a light beam; and forming a structure on said substrate said structure lying in the path of said light beam and functioning to move said beam so as to form a scanning beam for repetitively scanning a target for reflection therefrom, said structure being formed by depositing first and second layers of a piezoelectric material including lead zirconate and lead titantate on said substrate, and a layer of reflective material deposited on said first and second layers, the plane of said layer of reflected material being disposed at an acute angle with respect to said laser beam so that said beam is directed along an optical path toward indicia located in the vicinity of a reference plane lying generally normal to the optical path so as to scan spatially adjacent portions of the reference plane along a relatively elongated scanning line in response to an enabling electrical signal applied to said first and second layers.

19. A method of fabricating an integrated scanning device comprising the steps of:

providing a semi-insulating crystalline substrate;

forming a semiconductor laser diode structure on said substrate for generating a laser beam; and forming a reflective structure by depositing piezoelectric material on said substrate, said reflective structure lying in the path of said laser beam and capable of being piezoelectrically activated for mechanical displacement so as to deflect said laser beam and thereby form a scanning beam for repetitively scanning a target for reflection therefrom.

20. A method as defined in claim 19, wherein said step of forming a semiconductor laser diode structure comprises depositing a plurality of layers of gallium arsenide semiconductor material on said substrate.

21. A method of fabricating an integrated scanning device comprising the step of:

providing a semi-insulating crystalline substrate;

forming a semiconductor laser diode structure on said substrate for generating a laser beam; and forming a reflective structure by depositing first and second layers of piezoelectric material on said substrate, said reflective structure lying in the path of said laser beam and capable of being piezoelectrically activated for mechanical displacement so as to deflect said laser beam and thereby form a scanning beam for repetitively scanning a target for reflection therefrom.

22. A method as defined in claim 21, wherein said step of forming a reflective structure comprises depositing an interface layer of material on said substrate, and depositing said first and second layers of piezoelectric material on said interface layer.

23. A method as defined in claim 22, wherein said piezoelectric material comprises lead zirconate and lead titanate.

24. An integrated laser scanning device comprising:

a substrate composed of a semiconductor material;

a semiconductor laser device disposed on said substrate for generating a laser light beam;

scanning means including a scanning element composed of a layered composite material disposed on said substrate adjacent to said laser device and having a reflective surface portion capable of deformation when electrically activated, said scanning means extending from the plane of the substrate in the direction of said laser device and disposed at an acute angle with respect to said laser light beam and the substrate so that when the reflective surface portion is electrically activated, said beam laser light is deflected by said reflective surface portion and directed along an optical path toward indicia located in the vicinity of a reference plane lying generally normal to the optical path of said laser light beam so as to scan spatially adjacent portions of a target on the reference plane along a scanning line; and sensor means disposed on said substrate for detecting the intensity of the light reflected from said target and for generating an analog electrical signal indicative of the detected intensity.

* * * * *